Aug. 28, 1962   G. E. FAGOT ETAL   3,051,192
CONTROL SYSTEM
Filed April 20, 1960   3 Sheets-Sheet 1
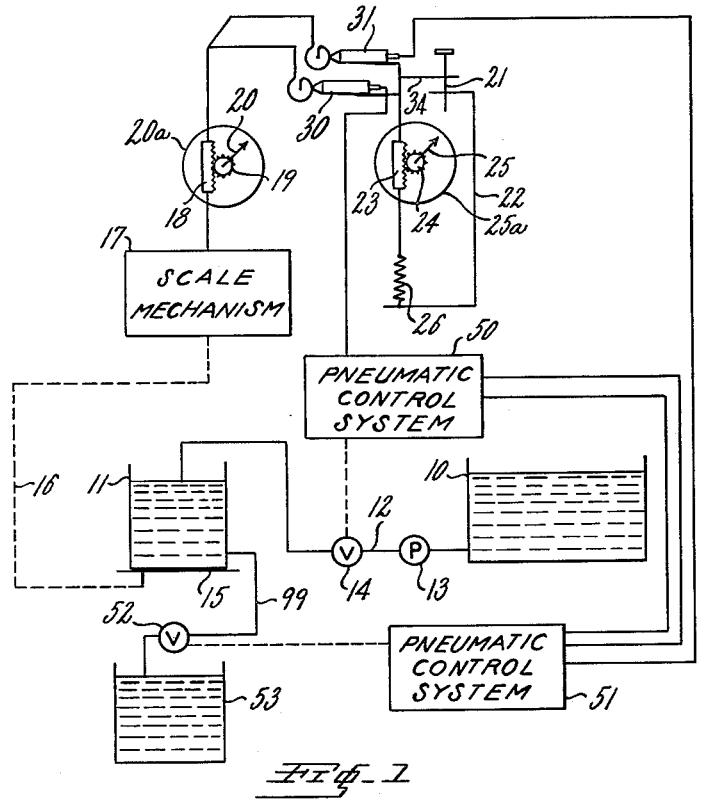
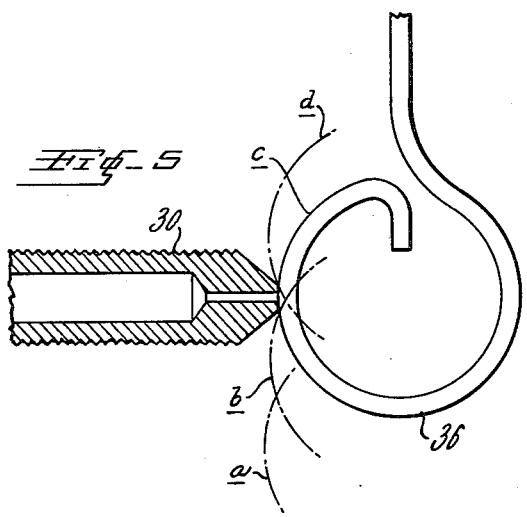
INVENTORS
GODFREY E. FAGOT
JOSEPH C. VANCE
BY
Charles A. Blank
ATTORNEY

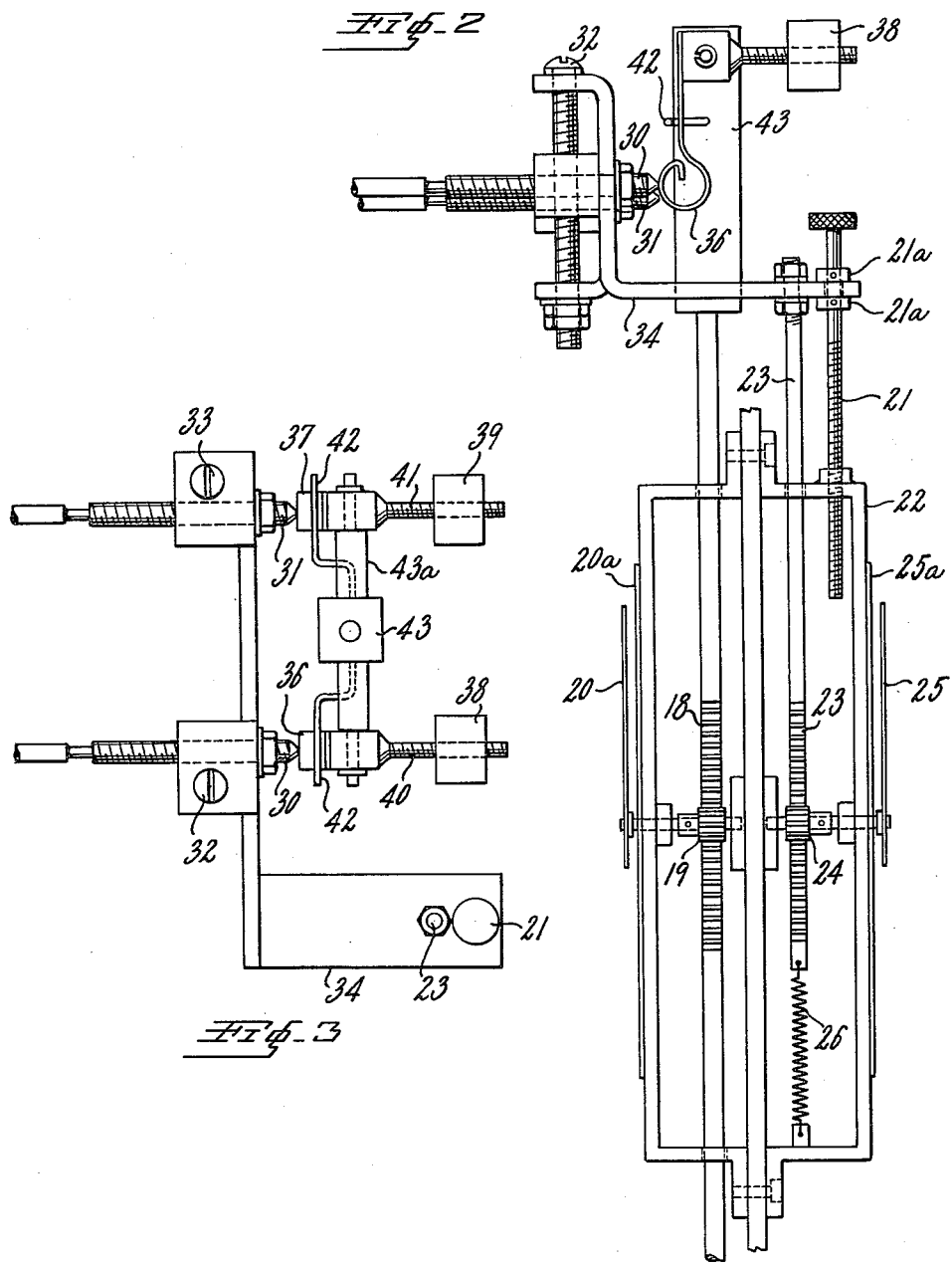

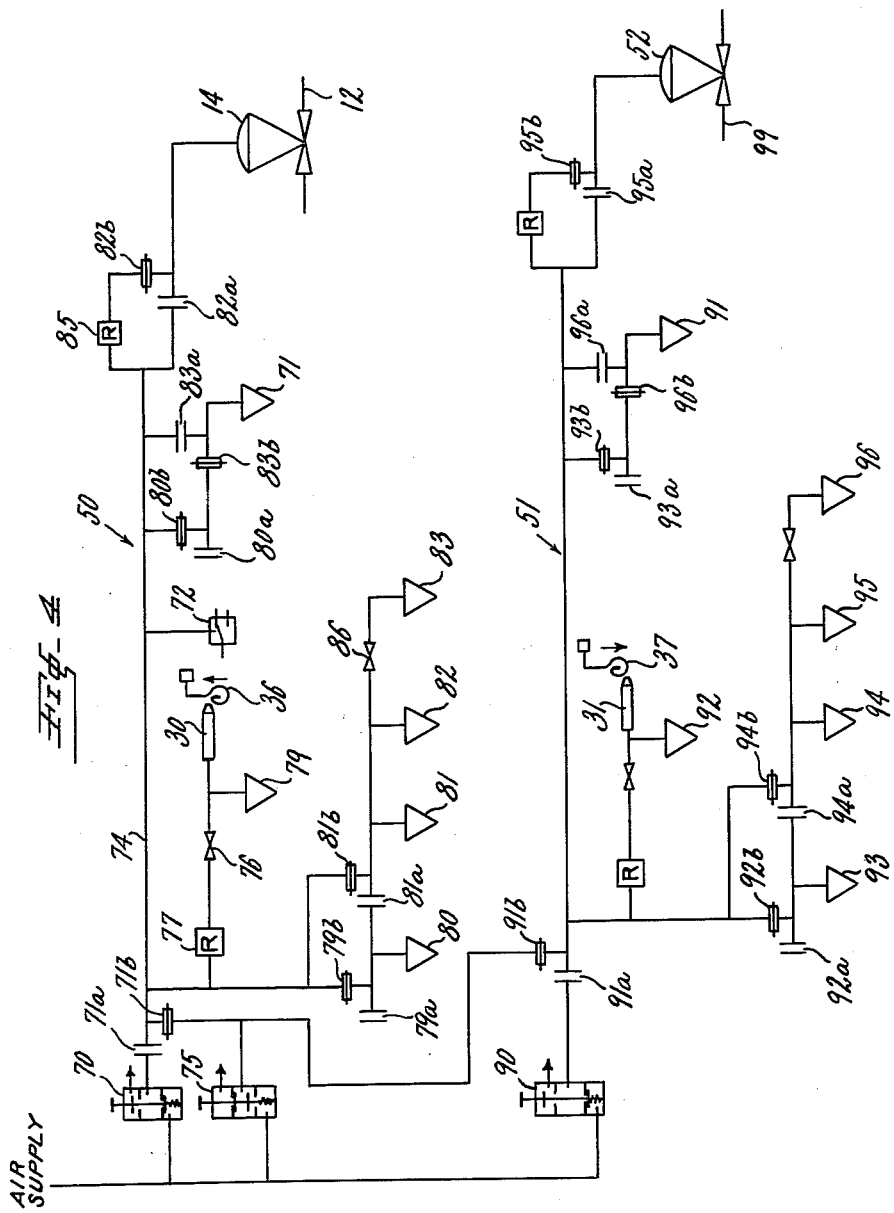

3,051,192
CONTROL SYSTEM
Godfrey E. Fagot and Joseph C. Vance, Baton Rouge, La., assignors to United States Rubber Company, New York, N.Y., a corporation of New Jersey
Filed Apr. 20, 1960, Ser. No. 23,434
5 Claims. (Cl. 137—391)

This invention relates to systems for controlling the flow of material and, more particularly, to systems of the type which controls the transfer of material to and from a vessel which is weighed to determine the quantity of material transferred. Such systems are useful in weighing fluid materials used in rubber or plastic mixtures.

It is an object of the present invention to provide a new and improved system for controlling the flow of chemical materials which minimizes the use of electrical circuits to avoid the possibility of explosion due to ignition of vapors.

It is another object of the invention to provide a new and improved system for controlling the flow of material, which is sensitive and accurate.

In accordance with the particular form of the invention, in a system for controlling the flow of material including valve means for controlling the flow of the material and a vessel for the material, control means comprising scale means for weighing the material and comprising a longitudinally displaceable member positioned in accordance with the weight of material. The system also includes nozzles means for discharging a stream of gas transversely with respect to the longitudinally displaceable member and baffle means having a surface with a gradually altered component of transverse displacement with respect to the longitudinally displaceable member. One of the nozzles means and the baffle means is attached to the displaceable member for longitudinal displacement and is effective to cause a gradual transverse variation of distance between the nozzle means and the surface of the baffle means to develop a gradual variation of back pressure in the nozzle means. The system also includes control means responsive to the back pressure of the nozzle means for controlling the flow of material in accordance with the weight of the material.

For a better understanding of the present invention, together with other and further objects thereof, reference is made to the following description taken in connection with the accompanying drawings, and its scope will be pointed out in the appended claims.

Referring to the drawings:

FIG. 1 is a schematic diagram of a flow control system constructed in accordance with the invention;

FIG. 2 is a side view, partly in section, of a portion of the FIG. 1 system;

FIG. 3 is a plan view of control members of the FIG. 1 system;

FIG. 4 is a schematic diagram of a portion of the FIG. 1 system; and

FIG. 5 is a diagram of control members of the system to aid in explaining the operation.

Referring now more particularly to FIGS. 1 and 2 of the drawings, a flow control system constructed in accordance with the invention comprises means for transferring flowing material from a storage vessel 10 to another vessel 11. The transfer means comprises a pipe line 12, pump 13, and a control valve 14, which may, for example, be a diaphragm control valve Kieley and Mueller Type 1250R. The vessel 11 is positioned on a scale platform 15 of conventional construction connected, as indicated by broken line 16, to a scale mechanism 17 for weighing the material in the vessel 11. The scale mechanism 17 may be of conventional construction, for example, a Fairbanks-Morse cabinet dial scale having a Model CA 42 cabinet dial. Scales of this type are described in Fairbanks-Morse Bulletin 8204, available from Fairbanks-Morse & Co., Chicago, Illinois. Such a scale mechanism includes a rack 18 which is displaceable longitudinally in proportion to the weight applied to the scale for rotating a pinion 19 mounted on a suitable frame 22 to position an indicator needle 20 to indicate the weight on dial 20a.

The control system also includes a manually adjustable set point indicator comprising a screw 21 threaded through frame 22 for longitudinally adjusting a rack 23 to rotate a pinion 24 and indicate a predetermined weight by a suitable indicator 25, 25a. One end of the rack 23 is attached to a movable bracket 34 through which screw 21 extends, free to rotate but longitudinally positioned in the bracket by collars 21a, 21a. The other end of the rack 23 is attached to a coil spring 26 attached to the frame 22. The pinion 24 is also rotatably mounted on the frame 22 by means of a suitable central shaft.

Referring now more particularly to FIGS. 2 and 3, the control system also includes nozzle means comprising a pair of nozzles 30, 31 for discharging transverse air streams through orifices of, for example, $\frac{1}{32}$ inch diameter. The nozzles 30, 31 are adjustably mounted on screws 32, 33, respectively, on bracket 34 and screw 21 for adjustment in accordance with the adjustment of the set point indicator. Ordinarily the nozzle 30 is adjusted to be slightly higher than nozzle 31 so that weigh-in and weigh-out indications may be read on a single dial.

The system also includes baffle means having a surface with a gradually altered component of transverse displacement. More particularly, the baffle means comprises a pair of members having cylindrical surface portions 36, 37. The baffles may, for example, each be a polished sheet of stainless steel with a cylindrical portion of about $\frac{3}{8}$ inch diameter and $\frac{5}{16}$ inch width. The baffles are pivoted at their ends on a rotatable shaft 43a and pivot support 43. Suitable counterweights 38, 39 may be positioned on studs 40, 41 to position the baffles against the nozzles when the baffles are above or below the nozzles, the baffles are positioned against stops 42. The pivot support 43 for the baffles is attached to the rack 18 for longitudinal displacement with respect to the nozzles in response to the weight of material in the vessel 11. Vertical displacement of the baffles is effective to cause a gradual horizontal variation of distance between the nozzles and the surfaces of the baffles to develop a gradual variation of back pressure in the nozzles, as will be explained more fully subsequently.

The flow control system also includes control means responsive to the back pressure of the nozzles for actuating the valve means to control the flow of material in accordance with the weight of material in the vessel 11. This control means comprises the pneumatic control systems 50, 51 of FIG. 1, represented in detail in FIG. 4, for controlling valve 14 and a valve 52, respectively, in a gravity-flow pipe line 99 for discharging material from the vessel 11 to a receiving vessel 53.

Considering now the operation of the FIG. 1 control system, an adjustment of the screw 21 of the set point indicator is made to indicate the weight of material it is desired to transfer from the storage vessel 10 to the scale vessel 11. By this adjustment, the nozzles 30, 31 are positioned above the baffles 36, 37. Material is then transferred from the storage vessel 10 to the scale vessel 11 through valve 14. The weight of the scale vessel 11 on scale mechanism 17 is indicated on the dial 20a by indicator 20 actuated by rack 18 and pinion 19.

As material flows into the scale vessel 11, the rack 18 with the attached baffles moves in an upward direction at a rate determined by the flow rate of material into the vessel 11. The total displacement of the rack 18 may, for example, be 2 inches for the entire scale range or .002 per scale division. The baffle 36 moves from a position *a* below the nozzle 30 where it does not obstruct the orifice to a position *b* where the baffle approaches contact with the tip of the nozzle partially obstructing the orifice, as represented in FIG. 5. The gradual variation of distance between the orifice and the baffle 36 causes the back pressure in the nozzle 30 gradually to increase until it reaches a predetermined value which may, for example, be 6.25 pounds per square inch gauge.

As will be explained more fully subsequently, when this predetermined back pressure is reached, the FIG. 4 control system is actuated partially to close the control valve 14 to reduce the rate at which material flows into the scale vessel 11. The material flows into the scale vessel 11 at a reduced rate as the baffle continues to rise. When the baffle surface completely obstructs the nozzle orifice, as represented in position *c* of FIG. 5, the nozzle back pressure reaches a maximum. As the baffle continues to rise above the nozzle orifice, as represented in position *d* of FIG. 5, the nozzle pressure decreases until it reaches a value of, for example, six pounds per square inch gauge. At this pressure the control system is effective fully to close the valve 14, as will be more fully explained hereinafter.

When it is desired to transfer material out of vessel 11 to the vessel 53, the indicator 23 is manually adjusted by means of adjusting screw 21, rack 23 and pinion 24 to indicate the weight of material it is desired to remain in vessel 11 after the transfer. The nozzle 31 is positioned below the baffle 37 when the set point adjustment is made. The rack 18 and baffle 37 move downwardly while material is transferred out of vessel 11. The sequence of operation is similar to that previously described with the orifice of the nozzle 31 being obstructed to actuate the pneumatic control system 51 and partially to close the valve 52 during a period of reduced flow. Thereafter, the baffle 37 continues to move downward past the nozzle to cause the back pressure to fall in the nozzle 31 and to actuate the pneumatic control system 51 to close the valve 52 completely, to assure that a precisely measured quantity of material is transferred from vessel 11 to vessel 53.

Referring now particularly to FIG. 4 of the drawings, the pilot valves may, for example, be Johnson three-way reversing diaphragm valves represented schematically with diaphragms as triangles and their normally open ports represented by a pair of spaced lines and their normally closed ports represented by connected lines. Each pilot valve has a normally open port and a normally closed port with a common port represented by junction of normally open and normally closed ports.

After the set-point indicator is adjusted to indicate the weight of material desired to be transferred into the scale vessel 11, positioning the nozzle 30 at the corresponding location above the baffle 36, the weigh-in start button 70 is pressed by an operator and air flows from a suitable supply of, for example, 20 pounds per square inch gauge through the normally open port 71a of pilot valve 71 to actuate the pump motor pressure switch 72. The weigh-in pump motor P (FIG. 1) then operates. Air flows through the normally open port 82a to the diaphragm of the weigh-in control valve 14 to open that valve fully and allow material to flow into the scale vessel 11 of FIG. 1.

Air flows through the normally open port 83a and actuates the diaphragm of pilot valve 71. The normally open port 71a of pilot valve 71 then closes, and the normally closed port 71b then opens. Air then flows through the normally open stop button 75 through the port 71b to pipe line 74. The start button may then be released and the pneumatic circuit will remain actuated, under the control of pilot valve 71.

Air also flows through needle valve restriction 76, through the nozzle 30 to the atmosphere. A regulator 77 is adjusted to maintain, for example, ten pounds per square inch gauge between the regulator and the needle valve. The needle valve 76 restricts the flow to such an extent that the pressure between the needle valve and the nozzle is, for example, about four pounds per square inch gauge. This pressure is below that necessary to actuate pilot valve 79. As the baffle moves up to gradually block the orifice of the nozzle, the nozzle pressure gradaully increases until it reaches, for example, 6.25 pounds per square inch gauge which is sufficient to operate the pilot valve 79 to close its normally open port 79a and to open its normally closed port 79b to allow air to actuate pilot valves 80, 81, 82, 83. When pilot valve 81 is actuated it completes a circuit by-passing the port 79b of pilot valve 79. The normally closed port 80b opens and allows air to flow through port 83b which opens to the valve diaphragm 71. The normally open port 82a closes, disconnecting the 20 pounds per square inch gauge air supply from the diaphragm of the weigh-in control valve 14. The normally closed port 82b opens, connecting the diaphragm valve 14 to a reduced pressure supply through pressure regulator 85. This causes the control valve 14 partially to close, reducing the rate at which material flows into the vessel 11.

Shortly thereafter, determined by the degree of restriction provided by a needle valve 86 pilot valve 83 is energized. The normally closed port 83b of the pilot valve then opens, connecting the diaphragm of pilot valve 71 to the air supply flowing through the port 80b. As the baffle rises to the point where it fully obstructs the nozzle as represented in FIG. 5, the back pressure in the nozzle builds up to, for example, ten pounds per square inch gauge.

As the baffle rises to a point slightly above the nozzle orifice causing the nozzle pressure to decrease to, for example, 6 pounds per square inch gauge, the pilot valve 79 returns to its unactuated condition. This causes the port 79a to open and to vent the diaphragm of pilot valve 80 to the atmosphere. The port 80a then opens and vents the diaphragm of pilot valve 71 to the atmosphere through the port 83b. When the pilot valve 71 is deactuated, its port 71b closes, shutting off the air supply flowing through the stop button 75. The port 71a opens, venting the lines to the atmosphere through the vent of the start button 70. With all the air drained from the system all components return to their normal positions and the pump pressure switch 72 is de-energized, causing the pump to stop. The control valve 14 is fully closed causing the flow of material into the scale tank 11 to stop.

The period of reduced flow between actuating and de-actuating pilot valve 79 is determined by the pressure setting of the regulator 77, the restriction of the needle valve 76, the diameter of the cylindrical portion of the baffle, and the force supplied by the counterweight which presses the baffle more tightly against the orifice at any given position of the baffle. These adjustments are customarily set to provide a reduced flow range of four to six percent of the total scale range.

To transfer material out of the vessel 11 into the receiving vessel 53, the set-point indicator is adjusted to indicate the weight of the material to remain in the vessel 11. This repositions the nozzle 31 to the desired point below the baffle 37. When the weigh-out start button 90 is pressed a sequence is initiated in control system 51 which is similar to that described above with the exception that no pump pressure switch is required because a gravity flow system is employed and the baffle is moving down rather than up. Valves and their ports of the system 51 are identified by corresponding reference numerals.

From the foregoing description, it will be apparent that a control system constructed in accordance with the invention has the advantages that it utilizes a minimum number of electrical components. The system also has the advantage that control elements of simple construction may be employed to provide an accurate control of a reduced flow period to transfer a precisely measured quantity of material with an accuracy of the order of plus or minus one-half percent the scale range. The system employs baffles which are self-adjusting in the presence of horizontal motion between the nozzle and baffle due to the pivoted and counterbalanced mechanism. For example, if the end of rack 18 moves slightly in a direction away from the nozzle due to slack or play in the scale mechanism, the counterbalance on the baffle causes the baffle to pivot toward the nozzle until the baffle is against the nozzle in substantially the same relation as prior to the horizontal displacement. The cylindrical construction of the baffle prevents undue friction or jamming as the baffle moves into physical contact with the nozzle. Moreover, the cylindrical construction of the baffle enables the baffle to continue moving in a given vertical direction while providing an increased back pressure to commence a period of reduced flow and then providing a decreased back pressure to terminate the period of reduced flow with a simple and effective control of the pilot valves.

While there has been described what is at present believed to be a preferred embodiment of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. In a system for controlling the flow of material including valve means for controlling the flow of the material and a vessel for the material, control means comprising: scale means for weighing the material and comprising a longitudinally displaceable member positioned in accordance with the weight of the material; nozzle means for discharging a stream of gas transversely with respect to said longitudinally displaceable member; baffle means having a surface with a gradually altered component of transverse displacement with respect to said longitudinally displaceable member; one of said nozzle means and said baffle means being attached to said displaceable member for longitudinal displacement and effective to cause a gradual transverse variation of distance between said nozzle means and said surface of said baffle means to develop a gradual variation of back pressure in said nozzle means; and control means responsive to the back pressure of said nozzle means for controlling the flow of material in accordance with the weight of the material.

2. In a system for controlling the flow of material including valve means for controlling the flow of the material and a vessel for the material, control means comprising: scale means for weighing the material and comprising a vertically displaceable member positioned in accordance with the weight of the material; nozzle means for discharging an air stream transversely with respect to said vertically displaceable member; baffle means having a surface with a gradually altered component of horizontal displacement; said baffle means being attached to said displaceable member for vertical displacement with respect to said nozzle means and effective to cause a gradual horizontal variation of distance between said nozzle means and said surface of said baffle means to develop a gradual variation of back pressure in said nozzle means; and control means responsive to the back pressure of said nozzle means for controlling the flow of material in accordance with the weight of the material.

3. In a system for controlling the flow of material including valve means for controlling the flow of the material and a vessel for the material, control means comprising: scale means for weighing the material and comprising a longitudinally displaceable member positioned in accordance with the weight of the material; nozzle means for discharging an air stream transversely with respect to said longitudinally displaceable member; means for adjusting the longitudinal position of said nozzle means; baffle means having a cylindrical surface portion; said baffle means being attached to said displaceable member for longitudinal displacement with respect to said nozzle means and effective to cause a gradual transverse variation of distance between said nozzle means and said surface of said baffle means to develop a gradual variation of back pressure in said nozzle means; and control means responsive to the back pressure of said nozzle means for controlling the flow of material in accordance with the weight of the material.

4. In a system for controlling the flow of material including valve means for controlling the flow of the material and a vessel for the material, control means comprising: scale means for weighing the material and comprising a longitudinally displaceable member positioned in accordance with the weight of the material; means including a pair of nozzles for discharging a pair of air streams transversely with respect to said longitudinally displaceable member; a pair of baffles each having a surface with a gradually altered component of transverse displacement with respect to said longitudinally displaceable member; said baffles being attached to said displaceable member for longitudinal displacement and effective to cause gradual transverse variations of distance between said nozzles and said surfaces of said baffles to cause corresponding gradual variations of back pressure in said nozzles; and control means responsive to the back pressure of said nozzles for controlling the flow of material in accordance with the weight of the material.

5. In a system for controlling the flow of material including valve means for controlling the flow of the material and a vessel for the material, control means comprising: scale means for weighing the material and comprising a longitudinally displaceable member positioned in accordance with the weight of the material; nozzle means for discharging an air stream transversely with respect to said longitudinally displaceable member; means for adjusting the longitudinal position of said nozzle means; baffle means having a cylindrical surface portion; said baffle means being attached to said displaceable member for longitudinal displacement with respect to said nozzle means and effective to cause a gradual transverse variation of distance between said nozzle means and said surface of said baffle means to develop a gradual variation of back pressure in said nozzle means; and control means responsive to one magnitude of back pressure of said nozzle means for reducing the flow of material and responsive to another magnitude of back pressure for terminating the flow of material in accordance with the weight of the material.

References Cited in the file of this patent

UNITED STATES PATENTS

| | | |
|---|---|---|
| 1,610,422 | Carlstedt | Dec. 14, 1926 |
| 2,124,811 | Bennett | July 26, 1938 |
| 2,877,785 | Hildenbrandt | Mar. 17, 1959 |
| 2,899,969 | Kirby | Aug. 18, 1959 |